United States Patent
Erdmann et al.

(10) Patent No.: US 9,537,671 B2
(45) Date of Patent: Jan. 3, 2017

(54) METHOD FOR CONTROLLING TRANSMISSIONS FROM A RESOURCE-RESTRICTED DEVICE, AND BATTERYLESS DEVICE

(75) Inventors: Bozena Erdmann, Eindhoven (NL); Lelkens Michel Marie Lelkens, Eindhoven (NL); Ludovicus Marinus Gerardus Maria Tolhuizen, Eindhoven (NL); Wei Yuan, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 626 days.

(21) Appl. No.: 13/318,679

(22) PCT Filed: Apr. 26, 2010

(86) PCT No.: PCT/IB2010/051815
§ 371 (c)(1),
(2), (4) Date: Nov. 3, 2011

(87) PCT Pub. No.: WO2010/128422
PCT Pub. Date: Nov. 11, 2010

(65) Prior Publication Data
US 2012/0056728 A1    Mar. 8, 2012

(30) Foreign Application Priority Data
May 7, 2009 (EP) .................................. 09305417

(51) Int. Cl.
*G05B 11/01* (2006.01)
*H04L 12/28* (2006.01)

(52) U.S. Cl.
CPC ............ *H04L 12/2827* (2013.01); *Y02B 60/50* (2013.01)

(58) Field of Classification Search
CPC ........ B66B 1/34; B66B 1/3438; B66B 1/3461; G08C 17/02; G08C 17/00; G07C 9/00182; G07C 2009/00793; A63H 30/04; H04L 12/2827; Y02B 60/50
(Continued)

(56) References Cited

U.S. PATENT DOCUMENTS 6,490,487 B1 *  12/2002  Kraus et al. .................... 607/60
6,531,964 B1 *   3/2003  Loving ...................... 340/12.51
(Continued)

FOREIGN PATENT DOCUMENTS

| CN | 1956288 A   | 5/2007 |
| CN | 101009036 A | 8/2007 |

(Continued)

OTHER PUBLICATIONS

Kushalnagar Intel Corp G Montenegro Microsoft Corporation C Schumacher Danfoss A/SN, "IPv6 over Low-Power Wireless Personal Area Networks (6LoWPANs): Overview, Assumptions, Problem Statement, and Goals; rfc4919.txt", IETF Standard, Internet Engineering Task Force, IETF, CH, Aug. 1, 2007.
(Continued)

*Primary Examiner* — Sisay Yacob

(57) ABSTRACT

The present invention relates to a method for controlling transmissions of a batteryless device (1) operating in a wireless network, the method comprising the following steps: the batteryless device (1) transmitting a frame including elements for controlling operation of a remote device (2a), or controlled device, the batteryless device being configured with a predetermined number of planned retransmissions of the control frame, the batteryless device sensing a change in the physical phenomenon induced by operation of the controlled device (2a), the batteryless device determining, based on the sensing step, the success or failure of the frame transmission, in case the transmission has succeeded, the batteryless device omitting further retransmis-
(Continued)

sions of the control frame. The present invention also relates to a batteryless device carrying out such method.

14 Claims, 1 Drawing Sheet

(58) Field of Classification Search
USPC ............... 340/12.5, 286.06; 49/13; 187/395; 294/102.2
See application file for complete search history.

(56) References Cited

U.S. PATENT DOCUMENTS

| | | | |
|---|---|---|---|
| 2004/0224676 A1* | 11/2004 | Iseki .............................. | 455/420 |
| 2004/0266419 A1* | 12/2004 | Arling et al. ................. | 455/420 |
| 2005/0017602 A1* | 1/2005 | Arms et al. ................... | 310/339 |
| 2005/0043918 A1* | 2/2005 | Katsurahira .................. | 702/178 |
| 2006/0063522 A1 | 3/2006 | McFarland | |
| 2006/0197676 A1* | 9/2006 | Smith ....................... | 340/825.69 |
| 2006/0212913 A1* | 9/2006 | Hirose et al. .................. | 725/86 |
| 2008/0123581 A1 | 5/2008 | Wells et al. | |

FOREIGN PATENT DOCUMENTS

| | | |
|---|---|---|
| JP | 63190493 A | 8/1988 |
| JP | 1144132 A | 6/1989 |
| JP | 5227567 a | 9/1993 |
| JP | 2002315063 A | 10/2001 |
| JP | 2003217869 A | 7/2003 |
| JP | 200861079 A | 3/2008 |
| WO | WO 2007030109 A2 * | 3/2007 |
| WO | WO2007030109 A2 | 3/2007 |

OTHER PUBLICATIONS

Naveed A. Abbasi, "6LOWPAN: IPv6 for battery-less Building Networks", TU Eindhoven, Aug. 31, 2009.

* cited by examiner

METHOD FOR CONTROLLING TRANSMISSIONS FROM A RESOURCE-RESTRICTED DEVICE, AND BATTERYLESS DEVICE

FIELD OF THE INVENTION

The present invention relates to a method for controlling transmissions from a batteryless device.

This invention is, for example, relevant for being used in wireless networks where batteryless devices control lamps or other devices whose operation has a detectable result, for example physically detectable.

BACKGROUND OF THE INVENTION

Wireless control has recently become a ubiquitous trend in the field of communication, especially for building management systems. Wireless technologies present major advantages in terms of freedom of placement, portability, and installation cost reduction, since there is no need for drawing cables and drilling. Thus, such technologies are particularly attractive for interconnecting detection, automation, control or monitoring systems using sensor devices such as light switches, light dimmers, wireless remote controllers, movement or light detectors, that have to be set up far away from each other and from the devices they control, e.g. lights.

One of the drawbacks appearing in networks of the like relates to device powering. Indeed, since the devices are not wired, they cannot receive power necessary for performing all the operations required in the network from the mains or via the connection with the controller. Thus, it has been envisaged to equip such devices with built-in batteries. However, since the devices are quite size-constrained, batteries may not be of a large size, which results either in a reduced device lifetime, or in a labour intensive battery replacement. Moreover, used batteries result in toxic waste.

It has been suggested to remedy this issue by equipping sensor devices with self-sustained energy sources that harvest energy from their environment. Still, the amount of energy achievable by off-the-shelf energy harvesters is very limited, which means that the features and functions of the batteryless devices are heavily restricted. Since waiting for an acknowledgment message after a transmission is energy-costly, especially in the case where no acknowledgment is received and thus re-transmission of the original message is required, existing communication methods for energy-harvesting batteryless devices do not implement any acknowledgment process, but directly perform several retransmissions of the message in order to ensure reliability of the communication. This solution is effective in that it generally allows for a correct reception. However, the solution also has several drawbacks. First of all, in such an implementation where no acknowledgment message is expected, a batteryless device never listens to events occurring in the network it belongs to. Accordingly, in case of configuration changes, for example regarding communication channel, network identifier or address assignment, the batteryless device cannot receive any information, and thus cannot adapt its transmission parameters to the new configuration, rendering further transmissions unsuccessful. Especially the inability to adapt to channel changes is critical, since it will either force the device assigned to receive the communication from the batteryless device to operate on multiple channels, which is technically very challenging due to real-time requirements of several control applications, or force the user to re-commission the batteryless device, which is labour-intensive and thus not acceptable from the user point of view. Secondly, the number of retransmissions is fixed, and does not vary even if one of the first transmissions succeeds. Accordingly, such implementations involve wasting energy for useless transmissions; this energy could be more purposefully used.

Moreover, for energy-saving reasons, all re-transmissions are sent without the proper channel access mechanism CSMA/CA required for correct operation of the network, thus potentially resulting in packet collisions and thus corrupted communication for other devices, batteryless, on the proxy network, or on other surrounding networks using the same frequency band.

SUMMARY OF THE INVENTION

It is an object of the invention to propose a method for controlling transmissions of frames by a batteryless device, in order to adapt further operations of the batteryless device depending on the success or failure of previous communications.

More precisely, it is an object of the invention to propose a method wherein a batteryless device receives feedback on its transmissions, via means differing from the communication interface.

More precisely, it is an object of the invention to provide a method that allows a batteryless device to skip additional transmissions when communication has been successful, thus allowing energy-savings in the batteryless device, and reduced collision probability for the surrounding devices.

To this end, the invention proposes a method for controlling transmissions of frames from a batteryless device operating in a wireless network. The method comprises the following steps:

the batteryless device transmitting a frame including elements for controlling physical operation of a remote device, the batteryless device being configured with a predetermined number of planned retransmissions of the frame, the batteryless device sensing a change in the physical phenomenon induced by the operation of the controlled device, the batteryless device determining, based on the sensing step, the success or failure of the frame transmission, in case the transmission has succeeded, the batteryless device skipping retransmissions of the frame.

As in conventional solutions, in the present invention a batteryless device is initially configured to perform a certain number of retransmissions. More specifically, in an exemplary embodiment, the method comprises the initial step of determining, e.g. by means of configuration, the number of retransmissions and the time spacing between them. However, contrary to existing methods, in the present invention the batteryless device having sent a control frame has means, differing from the communication interface, for obtaining a feedback on the success or failure on the communication, based on a sensing of a physical phenomenon controlled by the transmitted frame. Accordingly, the batteryless device is aware of the status of the communication, and can thus make a decision on future operations, i.e. either keeping on retransmitting the same packet or skipping the retransmissions.

Such a feature is of paramount importance for a batteryless device, because it allows the batteryless device to save energy by eliminating useless retransmissions. In an exemplary embodiment of the invention, the method comprises the step of the batteryless device harvesting a quantity of energy for performing the predetermined number of retransmissions. Thus, if retransmissions are skipped following a success in the communication, the harvested energy is not entirely consumed, and it can thus be used for other operations. Accordingly, in a specific embodiment, this remaining harvested energy is stored. In another specific embodiment, the remaining harvested energy is used for bidirectional communication, i.e. reception of wireless communication messages. In another specific embodiment, the received messages are maintenance messages.

The present invention also relates to a batteryless device used for controlling remote devices in a wireless network, the batteryless device comprising:
  a wireless communication interface comprising means for both transmission and reception of data,
  means for controlling the wireless interface,
  an energy-harvesting circuit,
  an energy storage,
  means for detecting changes in a physical phenomenon induced by operation of a controlled remote device.

Means for controlling the wireless interface comprise, for example, means for switching the interface from a sending mode to a receiving mode, and/or means for defining a number of retransmissions and a time spacing between retransmissions.

The energy harvesting circuit is used for harvesting ambient energy, which comes from either a physical phenomenon, like illumination, a technical phenomenon, like a motor vibration, or a user interaction, like a button push.

The energy storage is used for temporarily storing the harvested energy, and making it available to the communication interface or to other components such as a memory, controlling means, for example a micro-controller or other HW components, or sensors included in the detection means, used to determine the success of the transmission. The energy storage can take the form of e.g. solid-state battery or supercapacitor, characterized by low leak current.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
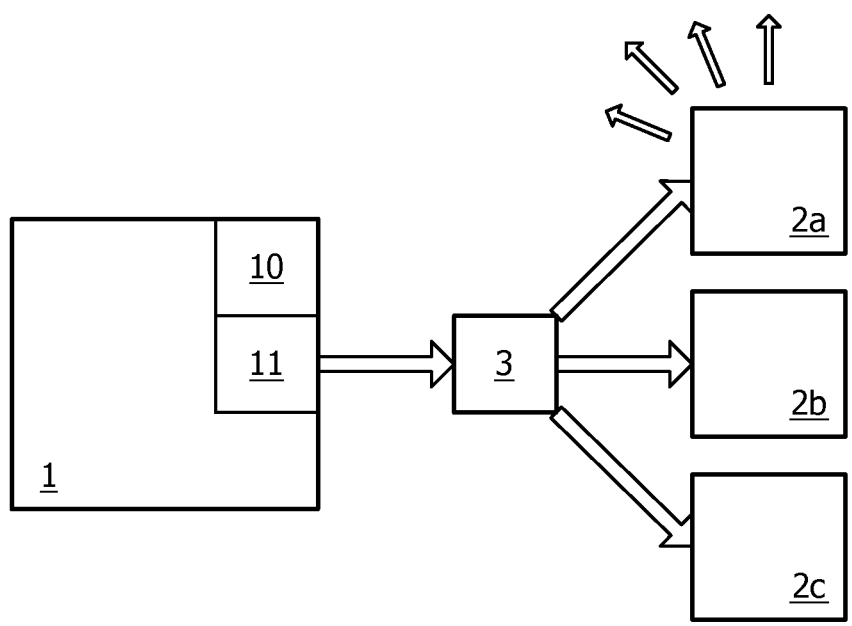
FIG. 1 shows a network carrying out a method according to the present invention.

The present invention relates to a method for controlling transmissions from a batteryless device 1 as shown in FIG. 1. The batteryless device 1 sends frames intended for controlled devices 2a, 2b, 2c. These transmissions are handled via a proxy device 3, receiving frames sent by the batteryless device 1 and forwarding them to the relevant destination device or group of devices, using unicast, multicast or broadcast transmission, whichever is provided by the wireless communication standard and chosen in the configuration step.

For correct operation of the present method, the batteryless device 1 is situated in physical proximity of the controlled devices 2a, 2b, 2c. This allows the batteryless device 1 to passively receive out-of-band feedback on the frames sent to the proxy device. Actually, a method according to the invention is to be applied in networks where the batteryless device 1 controls devices 2a, 2b and 2c that influence a physical phenomenon.

In the first example, the device 1 is a batteryless pushbutton light switch controlling on/off state of the lamps 2a, 2b and 2c. Thus, when triggered by user's pushbutton action, providing also for the harvested energy required for switch's operation, the batteryless device 1 sends frame to control the on or off state of the lights. In order to have a feedback on the success or failure of the transmission of the command frame, the batteryless device 1 detects the presence or absence of light (represented by arrows on FIG. 1) and compares the result of the detection with an expected result in view of the content of the command frame. The detection is performed energy-efficiently by using a sensor 10 included in the batteryless device 1, for example a light-sensitive resistance, a photodiode or a solar cell.

In another example, the device 1 is a batteryless light dimming switch or remote controller that affects a light intensity of the lamps 2a, 2b and 2c. In another example, the device 1 is a blind controller that affects the position of the blinds 2a, 2b and 2c. Thus, to determine whether a control frame has duly been received, the batteryless device 1 senses light intensity after having sent a control frame, then compares this light intensity to the light intensity sensed right before the transmission of the frame to determine the actual change of intensity. Based on this comparison, the batteryless device 1 can determine whether the transmission has succeeded or not. The detection is performed energy-efficiently by using a sensor 10 included in the batteryless device 1, for example a light-sensitive resistance, a photodiode, a solar cell, or an autonomous light intensity change sensor.

In yet another example, a batteryless device is a flow-energy-harvesting temperature sensor, and the controlled device 2c is a valve control, for example included in a thermostat, for controlling a flow. The batteryless device may then detect changes in voltage and/or current supplied by a rotating part of the flow-based energy harvester for having a feedback on the success of the transmission.

In yet another example, the physical phenomenon is influenced by the operation of the controlled devices 2a, 2b and 2c, in such a way that the individual contribution of each of the devices 2a, 2b and 2c can be detected. For example, device 1 is a batteryless light dimming switch, and the controlled devices 2a, 2b and 2c are lamps, with individual pulse-position-modulation parameters. In order to have a feedback on the success or failure of the transmission of the command frame, the batteryless device 1 checks the change in intensity of light emitted by each of the controlled devices 2a, 2b and 2c (represented by arrows on FIG. 1) and compares the result of the detection with an expected result in view of the content of the command frame.

The present invention is not restricted to the above-described devices, and can be applied to any controlled device whose operation has a physical consequence that can be energy-efficiently detected by the batteryless device.

Based on the feedback from sensor 10 indicating the success or failure of transmission of a control frame the batteryless device decides on further operation as follows:
  if the transmission has failed, then the batteryless device performs retransmission, based on the predetermined parameters related to the number of retransmissions and the time spacing between two transmissions, if the transmission has succeeded, then the batteryless device skips or drops further retransmissions, and the remaining harvested energy stays available in the energy storage.

In a preferred embodiment, the parameters of retransmission, i.e. the number of retransmissions and the time spacing between any two retransmissions, are determined in such a way that the feedback indicating transmission success can be received before all the retransmissions are sent. In this view, the determination of the parameters is made by taking into account the following elements:

the processing delay in the receiving device(s), the possible control network architecture, for example the number of hops the message has to travel to reach the controlled devices providing the physical feedback, the physical limitations of the controlled devices providing the feedback, for example a finite ignition time of a lamp, or a limited velocity of blinds in a blind controller.

The saved amount of the harvested energy can be used for different actions such as:

receiving and persistently storing the configuration data, like channel, network identifier, security key, addressing information, managing memory, e.g. performing the energy-costly operation of erasing the NVM, performing a discovery operation, for example to find a network, a better proxy or a new channel, collecting the reliability data, to adapt the batteryless device's behaviour on the long term, e.g. storing the long-term average number of packet retransmissions on the wireless medium leading to a control success, as observed by the detection means.

In view of the preceding, it appears that, contrary to conventional batteryless devices, a batteryless device according to the present invention may comprise, in an embodiment, means for switching a wireless interface 11 from a transmit mode to a receive mode, if the intended energy savings are to be used for maintenance data communication. Indeed, the device has to be in the transmit mode for transmitting a control frame to the proxy device 3, and, after receiving success confirmation from devices 2a, 2b, and 2c via "out-of-band" means, it must switch to the receive mode for receiving the maintenance data from the proxy 3. It is precised here that "out-of-band" means that the feedback is provided via a modality different than the wireless frame transmission. Moreover, it has to be noticed that reception of the feedback is performed at no, or negligible energy cost, to the batteryless device.

The proxy device 3 linked to the batteryless device 1 is obviously aware of the status of the batteryless transmissions, since it receives and processes the command frames from the batteryless device as well as acknowledgements from the controlled devices 2a, 2b, 2c; the proxy itself can be a physical-output device controlled by the batteryless device. Thus, the proxy can adapt its behaviour according to a success in batteryless frame reception. For example, after receiving an acknowledgement frame from all of the controlled devices 2a, 2b, 2c the proxy may switch to transmit mode and send the configuration data in-band to the batteryless device, i.e. via the wireless communication interface. The proxy can proceed, even if it cannot know whether the batteryless device timely and correctly interpreted the out-of-band feedback as success, since with high probability the proxy would only miss yet another retransmission from the batteryless device. Configuration data may include, for example, a new operational channel, a new security key, a new network or device identifier, to be used henceforth, preferably before the configuration change has become effective. Moreover, in a preferred embodiment, the proxy estimates the amount of energy left in the batteryless device, and adapts its actions, e.g. the amount of information transmitted to the batteryless device, to this amount of energy.

Moreover, in another embodiment of the invention, the batteryless device may be able to correctly receive just a fragment of configuration message from the proxy, not a complete one. It could be due to a too small amount of energy remaining on the batteryless device or because the estimation method used by the proxy to estimate the energy amount left on the ZBLD is not sufficiently precise, or because of packet corruption due to interference or other propagation phenomena. Yet, if the fragment is sufficient, i.e. if it allows for correctly identifying at least part of the fields, the batteryless device could still work with it, to modify its behaviour in the next operational cycle.

It can happen that the configuration change to be transmitted by the proxy device to the batteryless device, especially a channel change, may become effective before the batteryless device can receive it. Accordingly, in an embodiment of the invention, after a predetermined number of unsuccessful transmissions, the batteryless device performs the following steps:

storing in a non-volatile memory a flag informing about possible transmission channel change, sending the further retransmissions on another channel, and in case the further retransmission is successful, clearing the flag and storing persistently the new channel.

In yet another embodiment, the feature of "out-of-band" transmission success detection can explicitly be enabled and disabled on the batteryless device and/or the proxy. It could be done by the user as part of the initial configuration of the batteryless device. The batteryless device could also disable the by-default enabled feature, if after pre-defined number of control operations no change in physical parameters can be detected; then preferably also informing the proxy about this change. This will allow the batteryless device not to waste energy on physical parameter sensing and use it all for retransmissions instead.

Based on all the above elements, it is apparent that the present invention proposes a method and a batteryless device that allows overcoming the following drawbacks:

Limitation to 1-way communication with energy-harvesting, batteryless devices and its consequences for:

Inability to receive feedback on the control frames sent by the batteryless device, Inability to receive configuration and maintenance information, Inability to discover network problems (e.g. degradation of proxy link, network disappearance due to network re-configuration)

Nuisance of manual batteryless device re-commissioning, especially in case of channel changes, Nuisance of multi-channel operation of the proxy, Packets collisions in the proxy wireless network, caused by the multiple batteryless device retransmissions sent without using proper channel access mechanism.

The present invention is more especially dedicated to be used in wireless control networks like lighting control networks, building automation and home automation network comprising devices such as light switch, light sensor and presence detector. Specifically, it can be used in IEEE802.15.4/ZigBee based networks with batteryless devices implementing Batteryless ZigBee protocol or ZigBee RF4CE protocol; in 802.15.6-based networks, etc. However, the invention can be applied in any wireless network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless communication and which may be used instead of or in addition to features already described herein.

The invention claimed is:

1. A method for controlling transmissions of a batteryless device operating in a wireless network, the method comprising:
   transmitting, by the batteryless device over a wireless communication interface to a controlled device, a control frame including elements for controlling operation of the controlled device, the batteryless device being configured with a number of planned retransmissions of the control frame;
   sensing, by the batteryless device with a sensor, a change in a physical phenomenon induced by an operation of the controlled device, the operation of the controlled device being based on receiving the transmitted control frame, wherein the sensing of the change in the physical phenomenon is performed by the sensor device included in the batteryless device and different from the wireless communication interface;
   determining, by the batteryless device and based on the sensing, whether the transmitted control frame was received successfully by the controlled device; and
   canceling the further planned retransmissions of the control frame when the batteryless device determines the control frame was received successfully.

2. The method as recited in claim 1, further comprising determining the number of planned retransmissions and a time spacing between them.

3. The method as recited in claim 1, further comprising harvesting a quantity of energy for performing the number of planned retransmissions, wherein the number of planned retransmissions is predetermined.

4. The method as recited in claim 3, further comprising, storing the harvested energy for future use when the further retransmissions are cancelled.

5. The method as recited in claim 1, wherein the controlled device is configured to control light conditions, and wherein the sensing is performed by the batteryless device using the sensing device comprised in the group comprising: a light-sensitive resistance, a photodiode, a solar cell, and an autonomous light intensity change sensor.

6. The method as recited in claim 1, wherein the controlled device is a valve, and wherein the sensing is performed by the batteryless device by detecting change in a flow via change in a voltage or a current supplied by a rotating part situated in the flow.

7. The method as recited in claim 3, wherein the harvested quantity of energy is used by the batteryless device to receive configuration data, further comprising:
   in case of determining success of transmission, switching, by the batteryless device, from transmit mode to receive mode, and
   in case of a successful reception of the control frame, the controlled device switching from receive mode to transmit mode, and sending configuration data in-band to the batteryless device.

8. The method as recited in claim 3, comprising using the harvested quantity of energy for determining a transmission channel for transmissions of the control frames, and storing the determined transmission channel in a memory.

9. The method as recited in claim 8, comprising:
   storing in the memory an indication of unsuccessful transmission attempts,
   after a predetermined number of consecutive unsuccessful transmission attempts, storing in the memory a flag indicating a change of the transmission channel,
   sending subsequent transmissions on a new channel(s), and
   in case any of the subsequent transmissions is successful, clearing the flag and storing the new channel in the memory.

10. The method as recited in claim 9, wherein the sensing can be enabled and disabled.

11. The method as recited in claim 10, wherein the wireless network is a ZigBee network.

12. A batteryless device for controlling remote devices in a wireless network, the batteryless device comprising:
   a wireless communication interface comprising
      a receiver;
      a transmitter configured to transmit a control frame to one or more remotely controlled devices in a wireless network wherein the control frame includes information for controlling operation of the one or more remote devices, and wherein the transmitter is configured with a predetermined number of planned retransmissions of the control frame, and a switch configured to switch between a transmit mode and a receive mode; and
   a sensor device, within the batteryless transmitter, configured to detect a change in a physical phenomenon induced by the operation of the one or more remotely controlled devices, wherein said detecting the change in the physical phenomenon is performed by the sensor device and different from the wireless communication interface, and wherein the sensor device is further configured to notify the transmitter to cancel further planned retransmissions when the sensor device detects the change in the physical phenomenon.

13. The batteryless device according to claim 12, wherein the wireless communication interface is implemented according to a Batteryless ZigBee protocol.

14. The batteryless device according to claim 12, wherein the wireless communication interface is implemented according to a ZigBee RF4CE protocol.

* * * * *